(12) United States Patent
Voss et al.

(10) Patent No.: US 6,185,957 B1
(45) Date of Patent: Feb. 13, 2001

(54) COMBINED EVAPORATOR/ ACCUMULATOR/SUCTIONLINE HEAT EXCHANGER

(75) Inventors: Mark G. Voss, Franksville, WI (US); Jonathan P. Wattelet, Gurnee, IL (US); Stephen B. Memory, Kenosha, WI (US)

(73) Assignee: Modine Manufacturing Company, Racine, WI (US)

( * ) Notice: Under 35 U.S.C. 154(b), the term of this patent shall be extended for 0 days.

(21) Appl. No.: 09/390,818

(22) Filed: Sep. 7, 1999

(51) Int. Cl.[7] .......................... F25B 41/00; F25B 39/02; F25B 43/00
(52) U.S. Cl. ........................... 62/513; 62/515; 62/503
(58) Field of Search .................. 62/513, 515, 83, 62/527, 504, 503

(56) References Cited

U.S. PATENT DOCUMENTS

| | | |
|---|---|---|
| 2,133,961 | 10/1938 | Buchanan . |
| 2,503,922 | 4/1950 | Schumacher . |
| 2,511,716 | 6/1950 | Katzow . |
| 2,525,560 | 10/1950 | Pabst . |
| 2,936,599 | 5/1960 | Thomas . |
| 3,274,797 | 9/1966 | Kritzer . |
| 3,587,245 | * 6/1971 | Jacobs ....................................... 62/503 |
| 4,304,099 | 12/1981 | Vakil . |
| 5,212,965 | 5/1993 | Datta . |
| 5,242,015 | 9/1993 | Saperstein et al. . |
| 5,245,843 | * 9/1993 | Shimoya et al. ........................ 62/515 |
| 5,428,966 | 7/1995 | Alsenz . |
| 5,678,419 | * 10/1997 | Sanada et al. .......................... 62/205 |
| 5,678,422 | 10/1997 | Yoshii et al. . |

* cited by examiner

*Primary Examiner*—William Doerrler
(74) *Attorney, Agent, or Firm*—Wood, Phillips, VanSanten, Clark & Mortimer

(57) ABSTRACT

Extreme compactness is achieved in a combined evaporator 22 and suction line heat exchanger 20 through the use of a first, elongated, flattened, multi-port tube 34 having a major dimension $D_M$, a minor dimension $d_m$ measured transverse to the major dimension $D_M$ and opposed ends 38, 42. The tube is formed in a serpentine configuration by bends 48 across the minor dimension $d_m$ with a plurality of generally parallel, spaced runs 46 extending between the ends 38, 42 to define the evaporator 22. An evaporator inlet fixture 30 is provided on one of the ends 38 and an evaporator outlet fixture 32 is provided on the other end 42. Fins 50 extend between adjacent ones of the runs 46. A second, elongated, flattened, multiport tube 70 having a length that is a minor fraction of that of the first tube includes opposed ends 72, 74 a major dimension $D_M$, and a minor dimension $d_m$ measured transverse to the major dimension $D_M$. The second tube, along a side wall substantially defining the major dimension $D_M$ is bonded to a corresponding side wall of the first tube 34 at a location 58 immediately upstream of the outlet fixture 32 to be in good heat exchange relation therewith to define a heat exchange suction line heat exchanger integral with the evaporator 22.

20 Claims, 4 Drawing Sheets

COMBINED EVAPORATOR/ACCUMULATOR/SUCTIONLINE HEAT EXCHANGER

FIELD OF THE INVENTION

This invention relates to heat exchangers, and more particularly, to a combined suction line heat exchanger and evaporator for use in refrigeration systems.

BACKGROUND OF THE INVENTION

As is well known, discharge of refrigerants into the atmosphere is considered to be a major cause of the degradation of the ozone layer. While refrigerants such as R134a are certainly more environmentally friendly than refrigerants such as R12 which it replaced, they nonetheless are undesirable in that they may contribute to the so-called greenhouse effect.

Both R12 and R134a have been used largely in vehicular applications where weight and bulk are substantial concerns. If a heat exchanger in an automotive air conditioning system is too heavy, fuel economy of the vehicle will suffer. Similarly, if it is too bulky, not only may a weight penalty be involved, but the design of the heat exchanger may inhibit the designer of the vehicle in achieving an aerodynamically "slippery" design that would also improve fuel economy.

Much refrigerant leakage to the atmosphere occurs from vehicular air-conditioning systems because the compressor cannot be hermetically sealed as in stationary systems, typically requiring rotary power via a belt or the like from the engine of the vehicle. Consequently, it would be desirable to provide a refrigeration system for use in vehicular applications wherein any refrigerant that escapes to the atmosphere would not be as potentially damaging to the environment and wherein system components remain small and lightweight so as to not have adverse consequences on fuel economy.

These concerns have led to consideration of transcritical $CO_2$ systems for potential use in vehicular applications. For one, the $CO_2$ utilized as a refrigerant in such systems could be claimed from the atmosphere at the outset with the result that if it were to leak from the system in which it was used back to the atmosphere, there would be no net increase in atmospheric $CO_2$ content. Moreover, while $CO_2$ is undesirable from the standpoint of the greenhouse effect, it does not affect the ozone layer and would not cause an increase in the greenhouse effect since there would be no net increase in atmospheric $CO_2$ content as a result of leakage.

Such systems, however, require the use of a suction line heat exchanger to increase the refrigerating effect of the evaporator due to thermodynamic property relationships. If not used, an unusually high mass-flow rate of $CO_2$ and correspondingly high compressor input power levels are required to meet typical loads found in automotive air conditioning systems. Through the use of a suction line heat exchanger, the $CO_2$ mass-flow rate and compressor input power may be lowered with the expectation that a reduction in the size of the system compressor may be achieved. At the same time, the addition of a suction line heat exchanger to the vehicle has the potential for increasing weight as well as to consume more of the already limited space in the engine compartment of a typical vehicle. Thus, there is real need for a highly compact, highly effective suction line heat exchanger.

Heretofore, suction line heat exchangers have been utilized in relatively large refrigeration systems where the refrigerant discharged from the evaporator must be passed as a super-heated vapor to the compressor to assure that no liquid enters the compressor. This is necessary as compressors conventionally employed in refrigeration systems are positive displacement devices. As such, if any liquid refrigerant, coexisting within gaseous refrigerant in a saturated state, were drawn into the compressor, severe damage and/or loss of compressor pumping capacity would be likely to result.

Suction line heat exchangers avoid the difficulty by bringing, relatively hot, condensed refrigerant from the outlet of the system condenser or gas cooler into heat exchange relation with the refrigerant being discharged from the evaporator at a location between the evaporator and the compressor. As a consequence, the refrigerant stream exiting the evaporator will be heated. The suction line heat exchanger is sized so that the stream ultimately passed to the compressor from the suction line heat exchanger is a super-heated vapor at a temperature typically several degrees above the saturation temperature of the refrigerant at the pressure at that point in the system. As a consequence, no refrigerant will be in the liquid phase and the compressor will receive only a gaseous refrigerant. A typical system of this sort is shown schematically in FIG. 1.

Conventional suction line heat exchangers for commercial refrigeration applications are usually concentric, round tube devices having a substantial length. They are not suited for applications where space is at a premium. Other forms of suction line heat exchangers include the use of a large diameter round tube for conducting the outlet stream of the evaporator to the compressor. This tube is wrapped with a smaller diameter round tube which is employed to conduct liquid refrigerant from the condenser to the expansion device of the system. This form of heat exchanger is somewhat of an improvement over concentric round tube structures in that it takes the place of some of the connecting conduit between the condenser and the expansion device on the high-pressure side and between the evaporator and compressor on the low-pressure side, thereby providing somewhat of a space savings. However, the same remains quite bulky and consequently would be unsuitable for use in mobile refrigeration systems as, for example, vehicular air conditioning systems.

To achieve compactness, it has been proposed to combine the evaporator and the suction line heat exchanger into a single unit. One example of such a construction is shown in U.S. Pat. No. 5,678,422 issued Oct. 21, 1997 to Yoshii et al. Proposed is a so-called drawn cup evaporator construction which, at one end, is provided with a further drawn cup type of heat exchanger which serves as a suction line heat exchanger. While some degree of compactness is achieved, the addition of the drawn cup suction line heat exchanger adds considerable bulk to the evaporator.

Another instance of integrating a suction line heat exchanger in an evaporator is illustrated is U.S. Pat. No. 5,212,965 issued May 25, 1993 to Datta. In this patent, there is disclosed a round tube, plate fin type of evaporator construction which itself is relatively bulky with the consequence that sizable volume reductions cannot be obtained in spite of the integration of the suction line heat exchanger with the evaporator.

Kritzer in U.S. Pat. No. 3,274,797 issued Sep. 27, 1966 discloses a vapor compression refrigeration system, typically used in refrigeration, bringing a capillary tube interconnecting a condenser and evaporator (presumably serving as an expansion device) into contact with the suction line of the compressor to achieve heat exchange therebetween. Kritzer states that this varies the flow rate of refrigerant to the evaporator in response to the temperature of the refrigerant in the suction line to the compressor. While it thus appears that Kritzer is concerned with the exchange of heat between the outlet stream of the evaporator and the inlet stream from the condenser at the expansion device, it is done for the purpose of achieving flow control and therefore is not a suction line heat exchanger in the conventional sense.

Vakil in U.S. Pat. No. 4,304,099 issued Dec. 8, 1981 is somewhat similar in that a capillary tube connected to the outlet of the condenser is brought into heat exchange contact with an external surface of the evaporator along its entire length before discharging into the interior of the evaporator. Vakil is attempting to cool the incoming liquid refrigerant stream from the condenser to prevent the formation of vapor therein prior to its evaporation, an occurrence that would reduce thermodynamic efficiency. Because Vakil does not disclose the particular form of the evaporator utilized, it cannot be ascertained with any degree of certainty whether the design of the Vakil patent lends itself to compactness.

It will therefore be appreciated that in spite of the attempts to integrate suction line heat exchangers with evaporators, significant compactness has yet to be achieved.

SUMMARY OF THE INVENTION

It is the principal object of the invention to provide a new and improved suction line heat exchanger. Specifically, it is an object of the invention to provide a combined evaporator and suction line heat exchanger which is extremely compact. An exemplary embodiment of the invention achieves the foregoing object in a combined evaporator and suction line heat exchanger for use in a refrigeration system which includes a first elongated, flattened, multi-port tube having a major dimension, a minor dimension measured transverse to the major dimension and opposed ends. The first tube is formed in a serpentine configuration by bends across the minor dimension with a plurality of generally parallel spaced runs between the ends and defining an evaporator. A first tube inlet fixture is located on one of the ends of the first tube and a first tube outlet fixture is located on the other of the ends of the first tube. Fins extend between adjacent ones of the runs of the tube. A second elongated, flattened multi-port tube having a length that is a minor fraction of that of the first tube is provided. The second tube has opposed ends, a major dimension and a minor dimension measured transverse to the major dimension. The second tube, along a side wall substantially defining the major dimension, is bonded to a corresponding side wall for the first tube at a location immediately upstream of the outlet fixture to be in good heat exchange relation therewith to define a suction line heat exchanger. A suction line inlet fixture is located on one of the second tube ends and a suction line outlet fixture is located on the other of the tube ends.

As a consequence of this construction, a suction line heat exchanger is integrated into an evaporator and only increases one dimension of the evaporator by a distance corresponding to the minor dimension of the second tube. As a consequence a highly compact structure results.

In a preferred embodiment, the first tube, at the location where it is bonded to the second tube, is at nominal right angles to the runs and is in substantial abutment with some of the bends in the first two.

In a preferred embodiment, a third elongated, flattened, multi-port tube similar to a reverse image of the first tube is provided. The third tube has a major dimension, a minor dimension measured transverse to the major dimension and opposed ends. The third tube is formed in a serpentine configuration by bends across its minor dimension with a plurality of generally parallel, spaced runs between the ends thereof and fins extend between adjacent runs of the third tube. One of the third tube ends is in fluid communication with the first tube inlet fixture and the other of the third tube ends is in fluid communication with the first tube outlet fixture, and, together with the first tube, define a multiple circuit evaporator. The second tube is also bonded, intermediate at its ends, to the third tube at a location immediately upstream of the outlet fixture to be in heat exchange relation therewith.

In a preferred embodiment of the invention, the number of the runs in the first tube is equal to the number of the runs in the third tube.

In a highly preferred embodiment, the third tube is a mirror image of the first tube.

In one embodiment of the invention, the suction line outlet fixture is hydraulically located between the first tube inlet and outlet fixtures to provide for countercurrent flow in the suction line heat exchanger.

In one embodiment of the invention there are a plurality of the first tubes in stacked relation from one side of the combined evaporator and suction line heat exchanger to the other and corresponding one ends for the first tubes are connected to the first tube inlet fixture and corresponding other ends of the first tubes are connected to the first tube outlet fixture.

In a highly preferred embodiment, the second tube is nominally straight.

In one embodiment of the invention, the first tube inlet and outlet fixtures are defined by a single fixture block.

In another embodiment of the invention, the first tube is in two separate sections. One of the sections includes the generally parallel spaced runs and the other section is at the location where it is bonded to the second tube. An accumulator interconnects the two sections.

In a preferred embodiment, the accumulator is a vertically elongated tubular structure. Preferably, the other section of the first tube is connected to the tubular structure above a point of connection of the one section to the tubular structure.

In one embodiment, the accumulator is located to one side of the two sections. In another embodiment, one section defines an air flow path through the evaporator and the accumulator is adjacent to the one section and located in the air flow path.

In another embodiment, the first tube, at the location where it is in contact with second tube, is at a nominal right angle to the runs and in engagement with the bends. Small kinks or knob-like formations are located in the first tube at the location and aligned with and engage corresponding one of the bends. The kinks space small sections of the first tube from the second tube to avoid short-circuiting of the cooling action produced in the first tube.

Other objects and advantages will become apparent from the following specification taken in connection with the accompanying drawings.

DESCRIPTION OF THE PREFERRED EMBODIMENTS

A preferred embodiment of an evaporator with an integral suction line heat exchanger will be described in connection with the refrigeration system illustrated in FIG. 2. However, it is to be understood that the heat exchanger of the invention is not limited to use in refrigeration systems but may be employed with efficacy where a compact heat exchanger that utilizes gas as one heat exchange fluid to exchange heat with a second heat exchange fluid which in turn may exchange heat with itself or still a third heat exchange fluid.

It should also be understood that the invention may be employed with efficacy in refrigeration systems employing conventional refrigerants wherein evaporated refrigerant is truly condensed in a condenser as well as more sophisticated systems as, for example, transcritical $CO_2$ systems, wherein the compressed refrigerant is not literally condensed, but only cooled in a heat exchanger typically referred to as a gas cooler. Thus, as used herein, the term "gas cooler" not only refers to a heat exchanger that cools gas as in transcritical $CO_2$ systems, but also, to a conventional condenser in systems employing conventional refrigerant.

With the foregoing in mind, the refrigeration system illustrated in FIG. 2 will be described. The same is ideally suited for vehicular use because of its compactness and light weight. However, it may be used in stationary applications as well.

Figure 1:
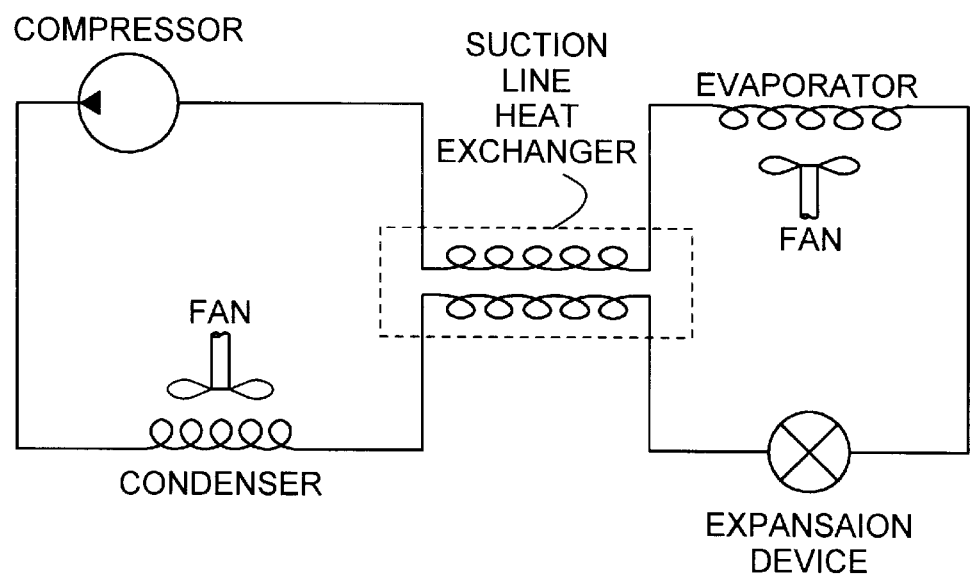
FIG. 1 is a schematic of a prior art refrigeration system including a suction line heat exchanger.
Figure 2:
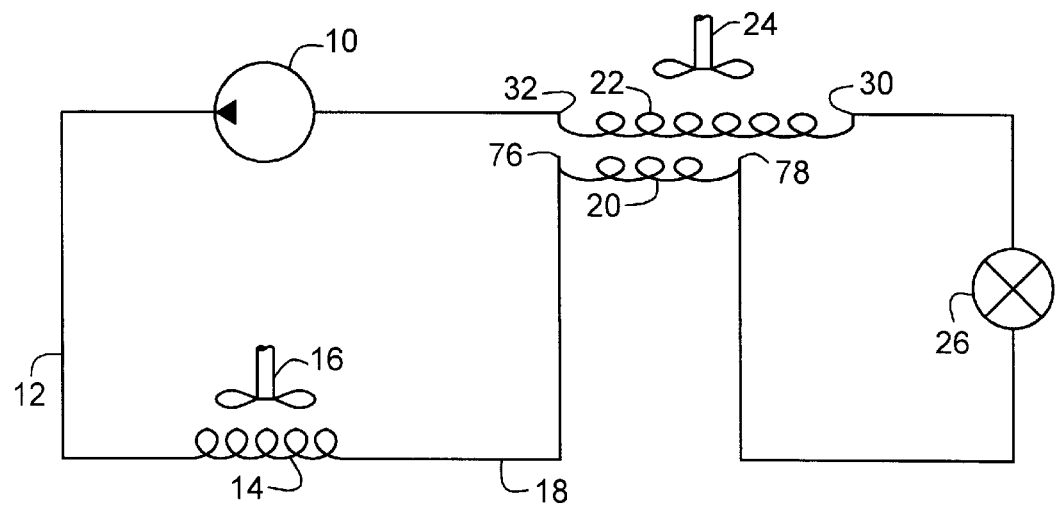
FIG. 2 is a schematic of a refrigeration system including a suction line heat exchanger and made according to the invention.

As seen in FIG. 2, the system includes a compressor 10 which provides hot refrigerant at high pressure at an outlet line 12 to a gas cooler 14. A coolant, such as ambient air is forced or drawn through the gas cooler 14 by a fan 16 as is well known. As a consequence, a condensed or highly cooled refrigerant at high pressure will exit the gas cooler 14 on a line 18 from which it is flowed to a heat exchanger 20 which is in heat exchange relation with a conventional evaporator 22, and specifically, in heat exchange relation with the evaporator 22 at its outlet side. A fan 24 is employed to drive or draw air to be cooled through the evaporator 22. Some of such air will flow about the heat exchanger 20 as well.

The heat exchanger 20 discharges still relatively hot, high pressure refrigerant to an expansion device 26 which discharges into the evaporator 22. The expanding refrigerant within the evaporator absorbs the latent heat of vaporization (in the case of an evaporating refrigerant). An evaporator only absorbs the latent heat. The evaporator 22 then heats incoming refrigerant in the suction line heat exchanger 20 and discharges to the inlet of the compressor 10.

Figure 3:
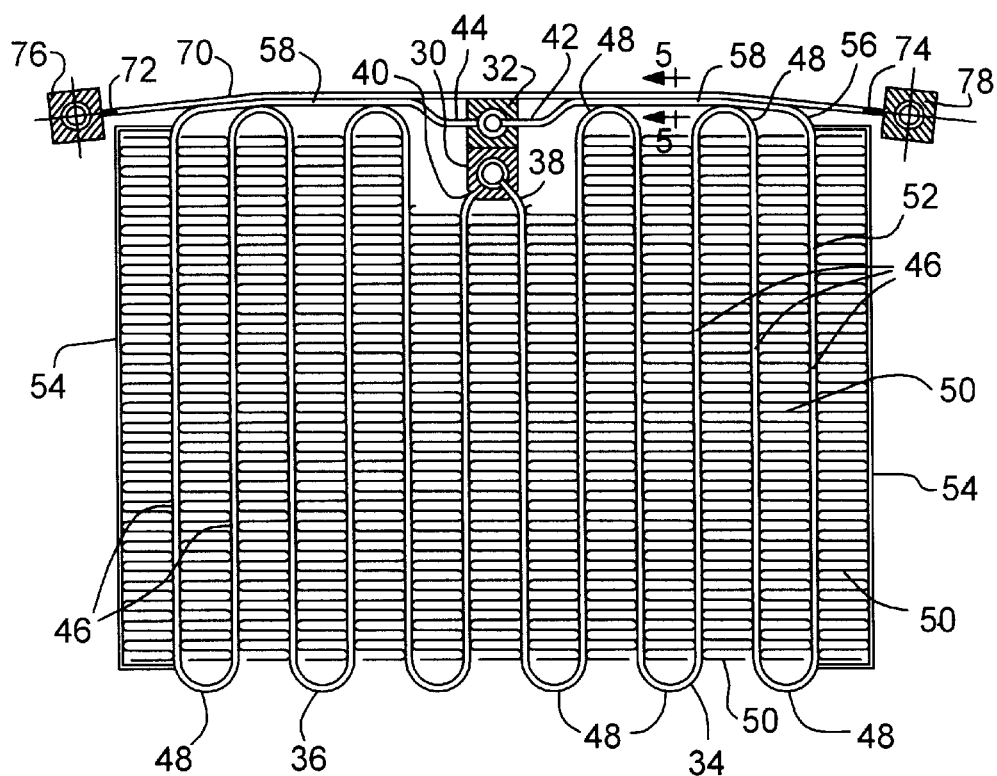
FIG. 3 is a vertical section of a six circuit evaporator with an integral suction line heat exchanger made according to the invention and taken approximately along the line 3—3 in FIG. 4.

Turning now to FIG. 3, the combined evaporator and suction line heat exchanger 20, 22 will be described in greater detail. The evaporator includes an inlet fixture 30 which preferably is bonded to be integral with an outlet fixture 32. The inlet fixture 30 would normally be connected to the expansion device 26 while the outlet fixture 32 would normally be connected to the inlet of the compressor 10.

Two long lengths of flattened tube 34, 36 are provided and have inlet ends 38 and 40 respectively that are connected to the inlet fixture 30. The tubes 34, 36 also have outlet ends 42, 44 which are connected to and in fluid communication with the outlet fixture 32.

The tube 34, intermediate the ends 38, 42 is bent into a serpentine configuration so as to have a plurality of generally parallel runs 46 connected by bends 48. The runs 46 are spaced from one another and extending between adjacent one of the runs 46 are serpentine fins 50.

One run designated 52, is an outlet run and is flanked by a side plate 54 sandwiching another serpentine fin 50 against the outlet run 52. At its upper end, the outlet run 52 is bent as at 56 through approximately 90 degrees to extend toward the outlet fixture 32 such that the end 42 of the tube 34 is in fluid communication therewith. This section of the tube 34 is designated 58 and is in contact with the bends 48 on the adjacent side of the evaporator and just upstream of the outlet fixture 32.

The tube 36 is a mirror image of the tube 34, is provided with a side plate 54 an outlet section 58 transverse to the runs 46, etc, etc. In fact, the tube 36 may be made identically to the tube 34 and merely flipped 180 degrees.

Because the tubes 34 and 36 are identical, in the illustrated embodiment, each tube 34, 36 will have the same number of the runs 46 as the other. However, it is to be understood that, if desired, one of the tubes 34, 36 could have a greater number of runs than the other.

As a result of the foregoing, it will be appreciated that a refrigerant to be evaporated, after being passed through an expansion device such as the expansion device 26 shown in FIG. 2, will enter the inlet fixture 30 to flow through both of the tubes 34, 36 to ultimately emerge at the outlet fixture 32.

To provide a suction line heat exchanger effect, a relatively straight section of tubing 70, also, an elongated tube, is metallurgically bonded as by brazing or soldering, to the outlet lengths 58 of both of the tubes 34 and 36. At its ends 72, 74, the tube 70 is respectively provided with an inlet fixture 76 and an outlet fixture 78. As can be appreciated from FIG. 2, the inlet fixture 76 is connected to the outlet of the gas cooler 14 while the outlet fixture 78 is connected to the inlet of the expansion device 26. As a consequence of this construction relatively hot refrigerant under high pressure will flow through the tube 70 from the fixture 76 to the fixture 78. It will be in heat exchange relation with low pressure, cooler refrigerant just as such refrigerant is about to be discharged from the evaporator 22 at the outlet fixture 32. As a consequence, the low pressure refrigerant will be heated to achieve super heating of the emerging stream.

Figure 4:
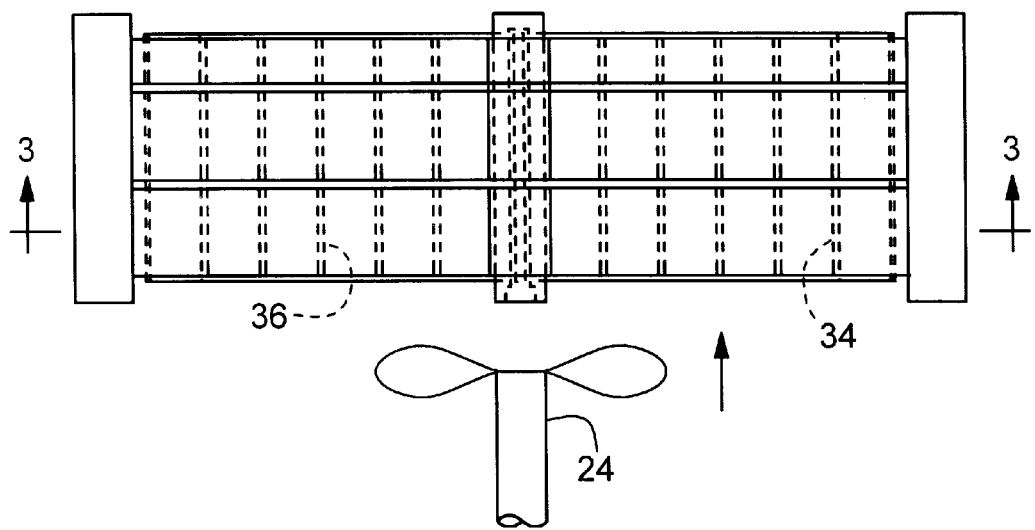
FIG. 4 is a plan view of the suction line heat exchanger integrated into an evaporator.

As seen in FIG. 4, several rows of the tubes 34, 36 may be employed in a stack. Thus, an upstream row of the tubes 34, 36 is designated A while a downstream row is designated B. An intermediate row is designated C. It is to be noted that the tube dimensions in each row need not be the same. Typically, but not always, there will be one of the tubes 70 for each of the rows A, B and C.

As generally alluded to previously, it is preferred to utilize flattened tubing of the so-called multi-port type. Such tubing will either be extruded or include an interior insert dividing the interior of the tubing into a plurality of passages. The passages may be either discrete or in fluid communication.

Figure 5:
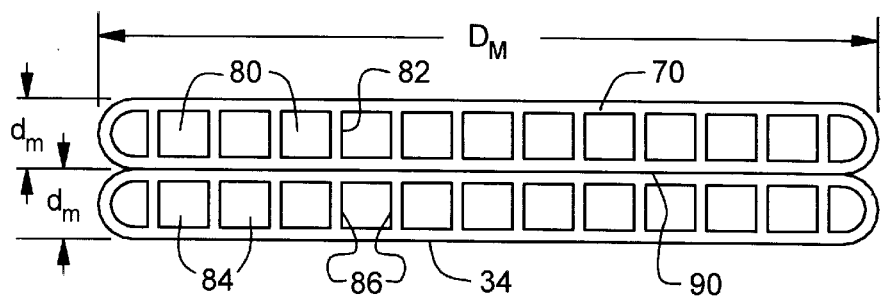
FIG. 5 is a sectional view taken approximately along the line 5—5 in FIG. 3.

Viewing FIG. 5, the tube 70 has a plurality of interior passages 80 separated by webs 82 which may be formed by extrusion or by a separate but bonded insert. The tubes 34, 36 include a plurality of interior passages 84 separated by webs 86 which may be similarly formed. Both the tubes 34, 36 and 70 are flattened tubes meaning that each will have a major dimension $D_M$ as well as a minor dimension $d_m$ measured transverse to the major dimension $D_M$. Because the tubes are flattened at their interface 90 (FIG. 5) an intimate bond may be obtained by brazing or soldering to assure good heat exchange contact between the tubes 70 and 34, 36.

Figure 6:
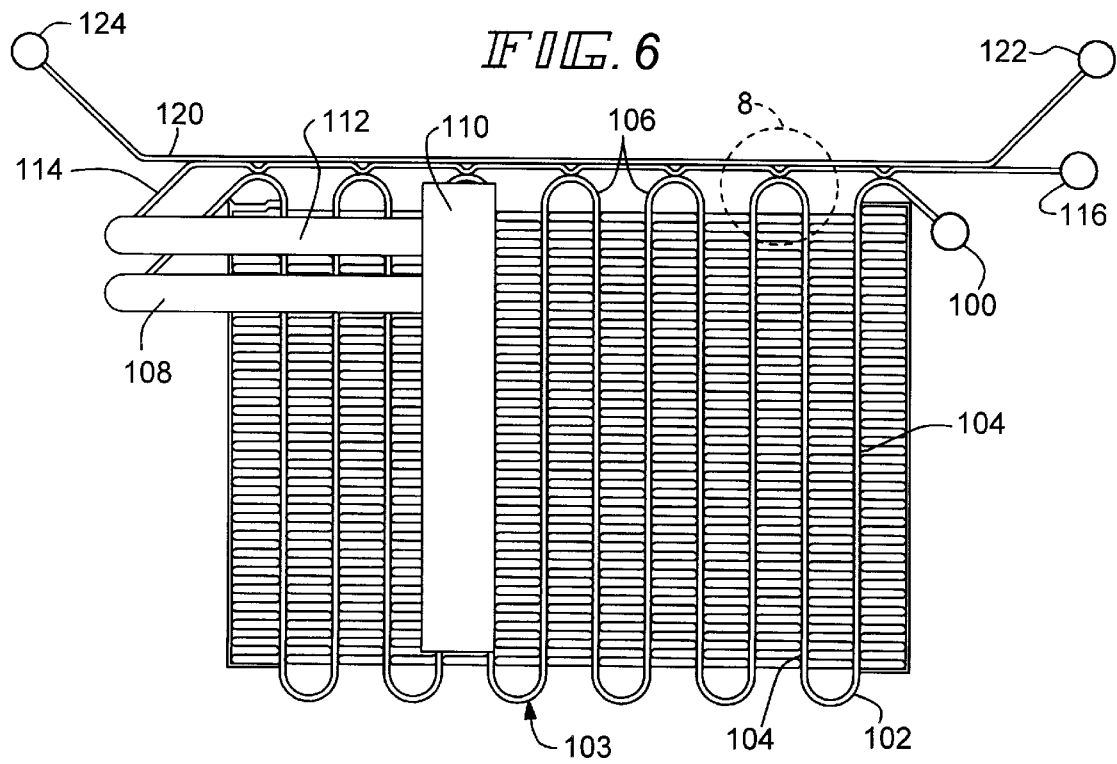
FIG. 6 is an elevational view of a modified embodiment of the invention.

An alternative embodiment is illustrated in FIG. 6. The same includes an inlet fixture 100 adapted to be connected to an expansion device such as that shown at 26 in FIG. 2. The inlet fixture 100 is connected to a tube 102 that is formed in two sections. The first section, generally designated 103, includes a multiport tube formed of a plurality of generally straight, parallel runs 104 that are interconnected by bends 106. The end of the first section 103 of the tube 102 is connected to be in fluid communication with a tube 108 which extends to a vertically oriented tubular accumulator structure 110. The accumulator 110 is closed at its ends and generally will be of circular or oval cross section. The conduit 108 is in fluid communication with the interior of the tubular structure 110 at a location just below an outlet conduit 112. Both are connected to the tubular structure 110 near its upper end.

The outlet conduit 112 is connected to a second section 114 of the tube 102 which extends at generally or nominally right angles to the runs 104 of the first section 103 of the tube 102 toward the side of the tube 102 having the inlet fixture 100 to an outlet fixture 116. The outlet fixture 116 is connected to the inlet for a compressor such as the compressor 10 shown in FIG. 2. In some instances, a conventional accumulator may be interposed between the outlet fixture 116 and the compressor 10.

A second, multiport tube 120 abuts and is bonded to the second tube 114 along substantially the entire length thereof as mentioned previously. The second tube 120 serves as a suction line heat exchanger and to this end, includes an inlet fixture 122 at one end and an outlet fixture 124 at its opposite end. The suction line heat exchanger thus defined is connected into a refrigeration circuit just as illustrated in FIG. 2.

It will thus be appreciated that a combined suction line heat exchanger and evaporator is provided wherein the refrigerant flow exiting the evaporator section is flowing countercurrent to the refrigerant flowing within the suction line heat exchanger defined by the tube 120. In this embodiment, the tubular structure 110 serves as an accumulator. While generally speaking, during steady state operation, there will be no liquid refrigerant exiting the evaporator through the second section 114 of the first tube 102, under transient conditions, such as during start-up, the exiting refrigerant may not be heated sufficiently by hot refrigerant in the suction line heat exchanger defined by the tube 120 so as to be all vapor when it emerges from the outlet 116 if the accumulator defined by the tubular structure 110 was not included. However, in the embodiment illustrated in FIG. 6, it will be appreciated that all refrigerant exiting the evaporator section defined by the first section of the tube 102 will enter the accumulator 110. Liquid refrigerant will accumulate at the bottom and only gaseous refrigerant will exit the outlet conduit 112 to be warmed by the suction line heat exchanger defined by the tube 120.

It will also be noted that in this embodiment, the first section of the tube 102 defines an air flow path through the evaporator. The accumulator, in this particular embodiment, is located closely adjacent to the first section of the tube 102 so as to be in the air flow path therethrough. Thus, to the extent that liquid refrigerant may be in the accumulator 110, the air flow past it will tend to cause the same to be warmed and evaporate during operation of the same.

Figure 7:
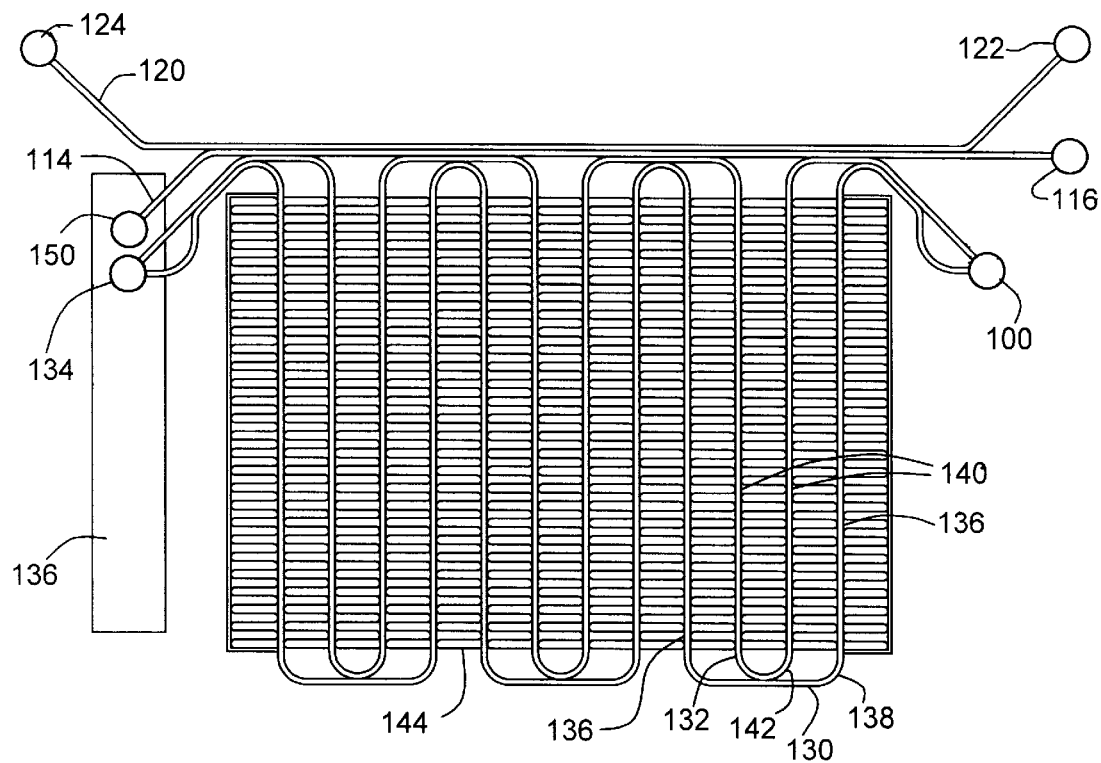
FIG. 7 is a side elevation of still another modified embodiment of the invention.

An alternative embodiment is illustrated in FIG. 7. The embodiment illustrated in FIG. 7 is similar to the embodiment illustrated in FIG. 6 except that the FIG. 7 embodiment is a multicircuit evaporator and the accumulator is to one side of the evaporator. Because of the similarity, where like components are present, like reference numerals will be used.

As illustrated in FIG. 7, the first section of the tube 102 is replaced by two, hydraulically parallel, serpentine formed tube sections 130 and 132. Both tube sections 130 and 132 are connected to the inlet fixture 100 as well as to a fixture 134 which serves as an inlet to a tubular accumulator assembly 136 which may be the same or identical to the tubular assembly 110. In this case, however, the accumulator 136 is to one side of the tube sections 130 and 132. The tube section 130 includes parallel runs 136 connected by bends 138 while the tubular section 132 includes straight, parallel runs 140, connected by bends 142. As a result, the tube sections 130 and 132 are intertwined in a serpentine fashion and serpentine fins 144 are conventionally employed.

In this embodiment, the second tube section 114 is connected to the accumulator 136 by a fixture 150 near the top end of the accumulator 136 and located above the fixture 134. Operation is generally the same as the embodiment illustrated in FIG. 6. The embodiment of FIG. 7 is intended to be employed in those applications where pressure drop may be of concern. By reason of the fact that the embodiment of FIG. 7 has twice as many circuits as the embodiment of FIG. 6, mass flow through each of the circuits is cut in half with a corresponding reduction in pressure loss.

Figure 8:
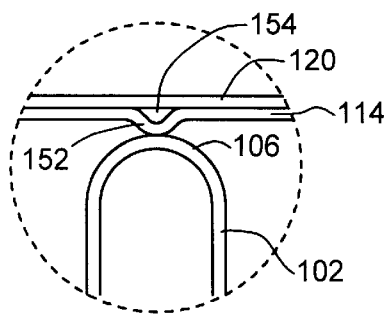
FIG. 8 is an enlarged, fragmentary view of one form of point of contact between the tube forming the suction line heat exchanger and the tube forming the evaporator.

In some instances, in all embodiments, concern for short-circuiting of the heat transfer paths in the evaporator section of the combined suction line heat exchanger and evaporator may be present. That is to say, in some instances, it is desirable that the cooling capacity of the refrigerant flowing through the evaporator section of the assemblage not be reduced by reason of rejection of heat from the suction line heat exchanger defined by the tube 70 or the tube 120 to the evaporator. Thus, the structure illustrated in FIG. 8 may be employed if desired. It is to be particularly understood that while FIG. 8 will be described in connection with the embodiment illustrated in FIG. 6, the structure of FIG. 8 may be advantageously employed in all embodiments if desired.

Specifically, the second tube section 114, where it contacts each of the bends 106, is provided with a shallow, U-shaped kink 152. Typically, the kinks 152 are bonded to respective bonds 106 as by brazing. The kinks 152 result in gaps 154 between the second tube 114 and the tube 120 defining the suction line heat exchanger which provides an impediment to heat transfer from the tube 120 to the tube section 102 where the two are in close proximity by reason of the presence of the tube 114. As a consequence, there is less heat transfer area available with the result that there will be a substantial resistance to heat transfer from the hot refrigerant flowing in the suction line heat exchanger to the refrigerant being evaporated within the evaporator section of the combined assemblage.

It is to be particularly noted that the many features of the various embodiments of the invention are generally interchangeable and the fact that a particular structure is shown as being useable with one embodiment, is not intended to restrict its use to that embodiment. Rather, it is to be understood that brazing of multiport tubes, the use of accumulators, the use of the kinks, the use of multiple rows of tubes, etc., etc. may be advantageously employed in each of the embodiments.

From the foregoing, it will be appreciated that a combined evaporator and suction line heat exchanger made according to the invention is extremely compact. Indeed, the envelope occupied by the evaporator 22 alone is increased minimally, only by the minor dimension $d_m$ of the tube 70 and whatever space is occupied by the inlet and outlet fixtures 76 and 78 to the tube 70. While the invention has been illustrated as being a two circuit design, a single circuit apparatus could be employed if desired. In such a case, it would be desirable to eliminate the tube 36 as a result, this would assure countercurrent flow in the tube 70 and the outlet section 58 of the tube 34 for maximum heat exchange efficiency.

Capacity can be increased or decreased as desired without changing the frontal area of the overall heat exchanger simply by varying the number of rows a, b, c in the heat exchanger.

What is claimed is:

1. A combined evaporator and suction line heat exchanger for use in air conditioning and refrigeration systems comprising:

a first elongated, flattened, multiport tube having a major dimension, a minor dimension measured transverse to the major dimension and opposed ends, said first tube being formed in a serpentine configuration by bends across said minor dimension with a plurality of generally parallel, spaced runs between said ends defining an evaporator;

a first tube inlet fixture on one of said ends;

a first tube outlet fixture on the other of said ends;

fins extending between adjacent ones of said runs;

a second elongated, flattened, multiport tube having a length that is a minor fraction of that of said first tube, opposed ends, a major dimension and a minor dimension measured transverse to said major dimension, said second tube, along a side wall substantially defining said major dimension, being bonded to a corresponding side wall of said first tube at a location immediately upstream of said outlet fixture to be in good heat exchange relation therewith to define a suction line heat exchanger;

a suction line inlet fixture on one of said second tube ends; and a suction line outlet fixture on the other of said second tube ends.

2. The combined evaporator and suction line heat exchanger of claim 1 wherein said first tube, at said location is at a nominal right angle to said runs and in substantial engagement with some of said bends.

3. The combined evaporator and suction line heat exchanger of claim 2 further including a third, elongated, flattened, multiport tube that is similar to a reverse image of said first tube, and having a major dimension, a minor dimension measured transverse to the major dimension and opposed ends, said third tube being formed in a serpentine configuration by bends across its minor dimension with a plurality of generally parallel, spaced runs between the ends thereof, and fins extending between adjacent third tube runs, one of said third tube ends being in fluid communication with said first tube inlet fixture, the other of said third tube ends being in fluid communication with said first tube outlet fixture to, together with said first tube, define a multiple circuit evaporator, said second tube further being bonded intermediate its ends to said third tube at a location immediately upstream of said first tube outlet fixture to be in a heat exchange relation therewith.

4. The combined evaporator and suction line heat exchanger of claim 3 wherein said third tube is a mirror image of said first tube.

5. The combined evaporator and suction line heat exchanger of claim 3 wherein the number of said runs in said first tube is equal to the number of said runs in said third tube.

6. The combined evaporator and suction line heat exchanger of claim 1 wherein said suction line outlet fixture is hydraulically located between said first tube inlet and outlet fixtures to provide for countercurrent flow in said suction line heat exchanger.

7. The combined evaporator and suction line heat exchanger of claim 1 wherein there are a plurality of said first tubes in stacked relation from one side of said combined evaporator and suction line heat exchanger to the other and corresponding one ends of said first tubes are connected to said first tube inlet fixture and corresponding other ends of said first tubes are connected to said first tube outlet fixture.

8. The combined evaporator and suction line heat exchanger of claim 1 wherein said second tube is nominally straight.

9. The combined evaporator and suction line heat exchanger of claim 1 wherein said first tube inlet and outlet fixtures define a single fixture block.

10. The combined evaporator and suction line heat exchanger of claim 1 where said first tube is in two separate sections, one said section including said generally parallel, spaced runs and the other said section being at said location; and an accumulator interconnecting said sections.

11. The combined evaporator and suction line heat exchanger of claim 10 wherein said accumulator is a vertically elongated tubular structure.

12. The combined evaporator and suction line heat exchanger of claim 11 wherein said other section is connected to said tubular structure above a point of connection of said one section to said tubular structure.

13. The combined evaporator and suction line heat exchanger of claim 10 wherein said accumulator is located to one side of said two sections.

14. The combined evaporator and suction line heat exchanger of claim 10 wherein said one section defines an air flow path through the evaporator and said accumulator is adjacent said one section in said air flow path.

15. The combined evaporator and suction line heat exchanger of claim 10 wherein there are two of said one tube sections intertwined with one another to define a multiple circuit evaporator.

16. The combined evaporator and suction line heat exchanger of claim 1 wherein said first tube, at said location, is at a nominal right angle to said runs and in engagement with said bends; and kinks in said first tube at said location, aligned with and engaging corresponding ones of said bends, said links being spaced from said second tube.

17. A two circuit evaporator with an integral suction line heat exchanger comprising:

a pair of elongated, flattened multiport tubes, each with opposed ends and formed into a serpentine configuration to define cores having plural, spaced, parallel runs, the one of said ends of each tube being hydraulically close to the corresponding inlet run being an inlet end and the other of the ends of each tube being an outlet end, a section of each tube just upstream of said outlet end extending along one side of the corresponding core in a direction generally transverse to the runs thereof to a location on another side of the corresponding core adjacent said inlet run;

said cores being oriented with respect to each other such that said inlet runs are adjacent one another and said upstream sections are aligned with one another;

an inlet fixture connected to both said inlet ends;

an outlet fixture connected to both said outlet ends; and an additional, elongated, flattened multiport tube extending along said upstream sections in heat exchange relation therewith.

18. The two circuit evaporator with an integral suction line heat exchanger of claim 17 wherein said additional tube is a nominally straight tube bonded to said upstream sections and having opposed ends between which said sections are located, an inlet connection on one of said additional tube ends, and an outlet connection on the other of said additional tube ends.

19. The two circuit evaporator with an integral suction line heat exchanger of claim 17 further including fins extending between adjacent ones of said runs.

20. The two circuit evaporator with an integral suction line heat exchanger of claim 17 wherein the tubes of said pair are identical to each other and are oriented so that one appears as the mirror image of the other.

* * * * *